C. McK. R. GLANVILLE.
Trimming Attachment for Sewing-Machines.
No. 216,322.　　　　　Patented June 10, 1879.
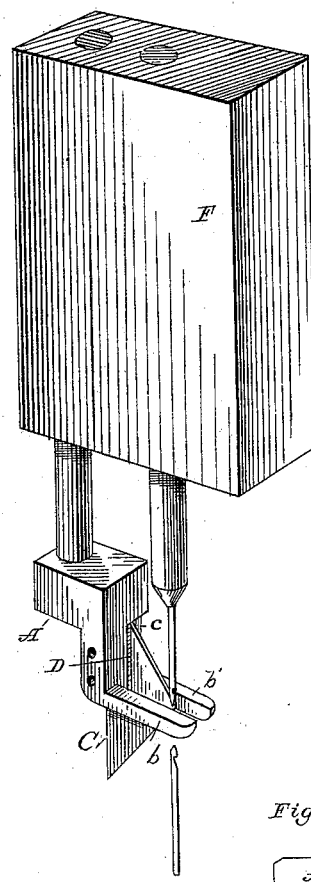

UNITED STATES PATENT OFFICE.

CHARLES McK. R. GLANVILLE, OF BALTIMORE, MARYLAND.

IMPROVEMENT IN TRIMMING ATTACHMENTS FOR SEWING-MACHINES.

Specification forming part of Letters Patent No. 216,322, dated June 10, 1879; application filed February 20, 1879.

*To all whom it may concern:*

Be it known that I, CHARLES MCKENDREE RILEY GLANVILLE, of the city of Baltimore, in the State of Maryland, have invented a new and useful Improvement in Trimming Attachments for Wax-Thread or other Sewing-Machines, of which the following is a full, clear, and exact description.

The object of my invention is to provide an improved trimming attachment for wax-thread or other sewing-machines, for the purpose of trimming the edges of the leather or other material simultaneously with the operation of sewing.

My invention consists in the combination, with the presser-foot of a sewing-machine, of a cutting-knife having an oblique cutting-edge, which knife is adjustably attached to the presser-foot, and has its cutting-edge laterally in line with the needle, and also in the particular devices hereinafter described for attaching and adjusting the knife.

That others skilled in the art may understand and use my invention, I will more particularly describe it, having reference to the accompanying drawings, in which—

Figure 1 is a view of the awl-bar and presser-foot of a wax-thread sewing-machine with my improvements attached; Fig. 2, a side elevation of the presser-foot with cutter attached; Fig. 3, a separate view of the cutter; Fig. 4, a view of the removable prong of the presser-foot; Fig. 5, one of the adjusting-plates, and Fig. 6 a horizontal section on line $x$ $x$ of Fig. 2.

In the drawings are shown the presser-foot and awl-bar, with awl attached, of a wax-thread sewing-machine, these being substantially similar to the same parts in other machines.

The presser-foot A is slotted, and has attached to the vertical portion thereof, and between the prongs $b$ and $b'$, (the latter of which is made removable, for the purpose of more conveniently attaching the cutting-knife, as herein described,) the cutting-knife C, which projects forward between the prongs to a point alongside of the needle of the machine, and downward below the lower surface of the presser-foot. The knife C is so attached to the presser-foot as to admit of the adjustment of its cutting-edge with reference to the needle, in order to regulate as desired its distance from the line of stitching, and to permit its adjustment opposite the needle. The cutting-knife is attached to the presser-foot by its rear edge, which is clamped to the vertical portion thereof by means of screws passing through the portion $c$ of the removable prong $b'$, and through corresponding holes in the rear portion of the knife. The lateral adjustment of the knife is accomplished by means of adjusting strips or plates D, placed between the knife and its seat, which plates are interchangeable, and are made of varying thickness. The holes in the back of the knife through which the screws pass are made larger than the screws, so that the knife can be moved sufficient to permit the exact adjustment of the cutting-edge with reference to the needle.

The cutting-blade C is triangular in general form, as shown in the drawings, and is attached by the upper portion of its rear vertical edge to the presser-foot, as before described, and extends forward between the prongs thereof. The cutting-edge extends from a point opposite the needle obliquely downward, forming, with the vertical back edge of the knife at its lower extremity, a sharp point. This point serves to pierce the material when the presser-foot is first brought down upon it, and the oblique cutting-edge then slits the material up to a point opposite the needle, and thence, when the machine is started, continues to sever the material in a line parallel with the seam as the material is carried forward under the presser-foot by the action of the feeding mechanism of the machine. The oblique cutting-edge of the knife operates to give a drawing cut, and is much more efficient than a vertical cutting-edge would be.

As before described, that portion of the cutting-edge immediately below the under surface of the presser-foot is so adjusted as to be approximately in line with or opposite the needle. By this arrangement the same distance is always preserved between the seam and the cut edge when the work is twisted, or in passing around curves—a condition which would not obtain under these circumstances were the cutting-edge situated either forward or back of the needle. It is also necessary to the successful operation of the device that the cutting-edge be situated near the extremity of the prongs of the presser-foot, in order that the effect of the feed shall be to draw the material against the cutting-edge, and by arranging the cutter in the slot of the presser-foot the action of the feed tends to draw on each side of the knife equally, and this prevents any tendency of the work to twist, as would be the case were the feed to operate upon one side of the knife alone.

I claim—

1. A trimming device for sewing-machines, consisting of a cutting-knife combined with the presser-foot thereof, and arranged substantially as shown and described.

2. A trimming device consisting of a cutting-knife combined with the presser-foot of a sewing-machine, and adjustably attached thereto, substantially as shown and described.

3. In combination with the presser-foot of a sewing-machine, a trimming-knife having an oblique cutting-edge, substantially as shown and described.

4. In combination with the presser-foot and awl-bar of a sewing-machine, a trimming-knife having its cutting-edge laterally in line with or opposite to the awl or needle, substantially as shown and described.

5. A slotted presser-foot, in combination with a laterally-adjustable cutting-blade, situated between the prongs thereof, substantially as shown and described.

6. The presser-foot A, having the removable prong $b'$, in combination with the knife C and the adjusting-plate D, substantially as shown and described.

CHAS. McKENDREE RILEY GLANVILLE.

Witnesses:
JOHN I. DOBLER,
HY. STOCKBRIDGE, Jr.